(12) United States Patent
Pollach et al.

(10) Patent No.: US 6,770,147 B2
(45) Date of Patent: Aug. 3, 2004

(54) METHOD FOR THE PRODUCTION OF SUGAR OR SUGAR-CONTAINING PRODUCTS FROM SUGAR-CONTAINING VEGETABLE RAW MATERIALS, SUGAR AND SUGAR-CONTAINING PRODUCTS MADE BY THE METHOD, AND EXTRACTION SOLUTION FOR USE IN THE METHOD

(75) Inventors: Günter Pollach, Grossenzersdorf (AT); Walter Hein, Vienna (AT)

(73) Assignee: Zuckerforschung Tulln Gesellschaft m.b.H., Tulln (AT)

( * ) Notice: Subject to any disclaimer, the term of this patent is extended or adjusted under 35 U.S.C. 154(b) by 56 days.

(21) Appl. No.: 10/298,398

(22) Filed: Nov. 18, 2002

(65) Prior Publication Data

US 2003/0101990 A1 Jun. 5, 2003

Related U.S. Application Data

(63) Continuation of application No. PCT/AT01/00142, filed on May 15, 2001.

(30) Foreign Application Priority Data

May 16, 2000 (AT) ............................................ 847/2000

(51) Int. Cl.[7] .................. C13D 1/00; A23L 3/3472; A23L 3/3508; A23L 1/09
(52) U.S. Cl. .............................. 127/42; 127/29; 127/44; 127/46.1; 127/46.2; 127/55
(58) Field of Search ............................ 127/29, 42, 44, 127/46.1, 46.2, 55

(56) References Cited

U.S. PATENT DOCUMENTS 5,728,740 A 3/1998 Barrett
5,827,522 A * 10/1998 Nowak ....................... 424/405

FOREIGN PATENT DOCUMENTS

| AT | 21279 | 9/1905 |
|---|---|---|
| AT | 404 469 B | 11/1998 |
| EP | 0 681 029 A2 | 11/1995 |
| JP | 55 081 816 A | 6/1980 |
| JP | 60 094 078 | 5/1985 |
| JP | 7 025 719 | 1/1995 |
| WO | WO 98/18321 | 5/1998 |
| WO | WO 00/18380 | 4/2000 |
| WO | WO 00/56938 | 9/2000 |
| WO | WO 01/05254 A2 | 1/2001 |
| WO | WO 01/06877 A1 | 2/2001 |
| WO | WO 01/88205 A1 * | 11/2001 |

OTHER PUBLICATIONS

Schneider: "Technologie des Zuckers" [sugar technology], Verlag Schaper, Hannover, 1968, pp. 247–253.
"Ullmanns Encyklopädie der technischen Chemie" [Ullmanns encyclopedia of technical chemistry], Verlag Chemie, Weinheim, 4th ed., vol. 24, 1983, pp. 703–748.
Günter Pollach et al.: "Einsatz von Hopfenprodukten als Bakteriostaticum in der Zuckerindustrie", Zuckerindustrie, vol. 121, 1996, No. 12, pp. 919–926.
Walter Hein et al.: "Neue Erkenntnisse beim Einsatz von Hopfenprodukten in der Zuckerindustrie", Zuckerindustrie, vol. 122, 1997, No. 12, pp. 940–949.
Van der Poel et al.: "Sugar Technology", Verlag Dr. Bartens, Berlin, 1998, pp. 152–157.
Van der Poel et al.: Sugar Technology (Beet and cane sugar manufacture), Verlag Dr. Bartens, Berlin, 1998, pp. 998, 1000, XP002177448.
Van der Poel et al.: "Zuckertechnologie" [sugar technology], Verlag Dr. Bartens, Berlin, 2000, pp. 163–168.
Günter Pollach et al.: "Neue Erkenntnisse zur Lüsung mikrobieller Probleme in Zuckerfabriken", Zuckerindustrie, vol. 124, 1999, No. 8, pp. 622–637.

* cited by examiner

Primary Examiner—David Brunsman
(74) Attorney, Agent, or Firm—Laurence A. Greenberg; Werner H. Stemer; Ralph E. Locher

(57) ABSTRACT

A method for producing sugar or sugar-containing products from sugar-containing vegetable raw materials involves production the sugar or sugar-containing products in the presence of added natural food-compatible resins. An extraction liquid containing the natural food-compatible resins is used in the method. As a result of the method, sugar or sugar-containing product is manufactured that also includes the natural food-compatible resins.

46 Claims, No Drawings

METHOD FOR THE PRODUCTION OF SUGAR OR SUGAR-CONTAINING PRODUCTS FROM SUGAR-CONTAINING VEGETABLE RAW MATERIALS, SUGAR AND SUGAR-CONTAINING PRODUCTS MADE BY THE METHOD, AND EXTRACTION SOLUTION FOR USE IN THE METHOD

CROSS-REFERENCE TO RELATED APPLICATION

This application is a continuation of copending International Application No. PCT/AT01/00142, filed May 15, 2001, which designated the United States and was not published in English.

BACKGROUND OF THE INVENTION

Field of the Invention

The invention relates to a method for the production of sugar or sugar-containing products from sugar-containing vegetable raw materials.

Sugar (sucrose) and sugar products are primarily obtained from the vegetable raw materials, such as sugar beets and sugar cane, by mechanically disintegrating these plants and extracting, or pressing out, sugar-containing solutions from the plant parts.

All of the sugar-containing media and, in particular, those that are directly obtained from agricultural raw materials are subject to microbiological decay through bacteria, yeasts, and mold within certain temperature ranges, pH values, and concentration limits. The risk of infestation by microorganisms in food-technological processes, both during continuous operation and during the storage of raw and intermediate products, always entails considerable hazards. Microorganisms can degrade sugars contained in the raw materials to acids and gaseous, even partially explosive metabolic products, or cause extremely high germ contents in the end products. Moreover, the process for the production of sugar from beets and sugarcane risks a microbial cleavage of the disaccharide sucrose into the monosaccharides glucose and fructose, which involves further disadvantages in addition to the immediate loss of sucrose, causing, for instance, a more intense coloration of the syrup, a higher need for alkalizing agents, and an increased amount of molasses occurred.

At temperatures of less than 50° C., which are applied during the extraction of juice by mechanical cell opening, the sugar-containing extraction solutions are subject to decay by all the microorganisms mentioned, i.e., yeasts, mold, and bacteria. However, when extracting juices by thermal cell opening at temperatures above 50° C., only thermophilic bacteria will still be capable of reproduction. An example of such a thermal extraction method is the presently widely applied extraction of sugar beets for the purpose of sugar production.

In extraction plants, thermophilic bacteria, as a rule, are combated by the batch-wise or continuous addition of germ-inhibiting or germ-killing auxiliaries to the juice flow or perishable intermediate products. In the sugar industry, formalin, dithio-carbamates, peracetic acid, ammonium bisulfite, quaternary ammonium bases etc. are, for instance, used to this end.

Recently, some sugar factories also have used hop products as natural agents to combat microorganisms, if the addition of chemical agents is undesired or prohibited by law (EP-0 681 029 A; Pollach et al., Zuckerindustrie 124 (8) (1999), 622–637; Pollach et al., Zuckerindustrie 121 (2) (1996), 919–926; Hein et al., Zuckerindustrie 122 (12) (1997), 940–949). In doing so, it turned out that there was no real alternative to this natural agent, which is why it has not been possible so far to pass over to another natural agent when selecting hop bitter acid-resistant bacterial strains or adapting bacterial strains to hop products, in order to thereby combat such a selection or adaptation. Moreover, suitable hop products at economically reasonable prices such as β-hop acids are available on the market only in limited quantities as byproducts occurring in the production of isoalpha acids. Also from this results the need for additional natural auxiliary agents to combat microorganisms.

SUMMARY OF THE INVENTION

It is accordingly an object of the invention to provide a method for the production of sugar or sugar-containing products from sugar-containing vegetable raw materials, sugar and sugar-containing products made by the method, and extraction solution for use in the method that overcome the hereinafore-mentioned disadvantages of the heretofore-known methods and products of this general type and that suppresses the growth of undesired microbes in the context of industrial sugar production processes can be suppressed.

With the foregoing and other objects in view, there is provided, in accordance with the invention, a method for producing sugar or sugar-containing products from sugar-containing plant raw materials, which is characterized in that the production is at least partially carried out in the presence of added natural food-compatible resins. The plant raw materials are generally vegetable raw materials.

Surprisingly, an efficient and cost-effective option to effectively inhibit the growth of undesired microbes could be provided by the addition of such resins in the course of industrial sugar-production processes. The addition according to the invention of food-compatible resins is particularly effective in the inactivation of thermophilic and/or osmophilic microorganisms, which constitute particularly persistent sources interfering in the sugar-production process, which are difficult to combat.

These resins are not necessarily required to be present during the whole production process. According to the invention, the use of these resins is also feasible merely in selected process steps. According to the invention, the partial or temporary presence of the added resins above all proved successful under those conditions at which thermophilic and osmophilic microorganisms would grow particularly well. Yet, the resin addition according to the invention is also suitable for low temperatures, particularly because it turned out that undesired germs could be selectively reduced or suppressed at those temperatures as well.

According to the invention, sugar beets and sugar cane are above all envisaged as vegetable raw materials. In principle, the method according to the invention is, however, applicable to alls sorts of vegetable starting materials such as, e.g., in the sugar production departing from sugar palms, dates, sugar maize, tree juices like, e.g., maple juice, etc.

It was shown that the resins added according to the invention exhibited anti-microbial activities also in the primarily aqueous surroundings of sugar production. Due to the good solubility of these products in alcoholic solutions, it has so far been anticipated that such products can be used only in alcoholic food stuffs (retsina) with alcohol levels of, for instance, 10% or more. However, according to the invention, it was found that the added food-compatible resins could be effectively used in efficient concentrations also in large-scale sugar production.

According to the invention, any food-compatible resins as described, for instance, in "Ullmann's Encyclopedia of Industrial Chemistry", Vol. A23 (1993), pp 73–88 can be employed, including, for instance, tree resins and, in particular, gum rosins like, e.g., benzoin, colophony, myrrh, and balsam of Tolu. According to the invention, colophony products and derivatives are above all preferred for economic reasons. Such products are, for instance, described in Ullmann's Encyclopedia of Industrial Chemistry, Vol. A23 (1993), pp 79–88 (expressly incorporated by reference).

In a preferred manner, the colophony (preparations) or colophony derivatives described there are, above all, used as natural resins according to the invention. Preferably, a dissolved, emulsified or dispersed, or pasty rosin product is used, which is preferably based on rosin, colophonium, rosin acids, rosin acid salts (resin esters), undenatured pine resin derivatives (i.e., derivatives obtained without the influence of strong acids or bases). According to the invention, colophony derivates also encompass chemically synthesized colophony single components or colophony single components isolated from colophony products such as, for instance, levopimaric acid, neoabietic acid, palustric acid, abietic acid, dehydroabietic acid, tetra-hydroabietic acid, dihydroabietic acid, pimaric acid and isopimaric acid. The derivatization of colophony may also include hydration, polymerization, addition reactions, esterification, nitrilation, amination, etc.

Preferably, also molten products and/or products mixed with viscosity-reducing agents such as, e.g., alcohol or glycerol, can be used. Thus, it is, for instance, possible to dose colophony into an extraction plant from a melting vessel through heated tubes.

The pine resin products mentioned constitute physiologically safe natural products that have been consumed by man for many centuries, for instance in the form of resinated wine. Long experience has shown that colophony as a component of brewer's pitch, which was used to seal beer barrels, is to be regarded as safe, as is its main component abietic acid. Pine resin products are also used in chewing gums: toxicological studies in men having revealed no hints of health risks even after 25 years. Pine resins and colophony as such or in the form of derivatives are admitted in numerous countries primarily for packages that get into contact with food.

Although pine resins have been added to wine as preservatives for many centuries, there is no hint as to combating microorganisms with pine resins or its components in technological and preferably food-technological processes, even in comprehensive technical encyclopedias (cf. Ullmann, 5th Ed., Vol. A23, pp 73 to 88).

Pine resins have so far been used for dyes, lacquers, coatings, inks, adhesives, gums, tires and, furthermore, in medicine for the production of ointments and in the cosmetic field. The colophony component abietic acid was also used to promote lactic acid and butyric acid fermentations. All the more surprising is the action according to the invention regarding the inhibition of germs in the context of sugar production processes.

According to the invention, the addition of an aqueous, slightly-alkaline salt solution or an alcoholic solution of tree resins, in particular colophony or colophony derivatives, proved to be advantageous. Likewise, it can be beneficial in some cases to use the agent in dry form. Solid ground products, e.g. colophony, can be introduced, for instance, by throwing same through the openings of an extraction trough.

It was shown according to the invention that the natural resins should preferably be used in amounts ranging from 0.1 to 1000 mg/l. The at least partial or at least temporary presence of natural resins in these amounts in the liquid phase during the sugar production process proved beneficial. It is, however, clear that the concentration of such resins may deviate as a function of the realization of the sugar production process (continuous/discontinuous) and, in particular, where the resins are added in batches into the production process and, for instance, into the extraction solution. Particularly preferred concentration ranges of the resins to be used according to the invention during the production process are from 5 to 40 mg/l, in particular 10 to 25 mg/l.

In a preferred manner, the natural resins are added as salt-containing solutions or suspensions. In this respect, potassium salt solutions or sodium salt solutions turned out to be beneficial, especially in salt concentration ranging from 0.5 to 35%. With sodium salt solutions, the optimum salt concentration also may reach no more than approximately 20%. The natural resins can also be added as alcoholic solutions or suspensions, preferably as 1 to 95%, particularly 10 to 80%, ethanol solution. It was shown that the use according to the invention of natural resins is particularly suitable for combinations with further antimicrobial agents in the course of the production process. Preferably, further food-compatible anti-microbial agents are used in such combinations.

In this respect, the combination according to the invention with hops or hop derivatives is particularly preferred. Sugar production processes in which such hops or hop derivatives are used are, for instance, described in Europen Patent No. EP 0 681 029 B1. According to the invention, the combination of further anti-microbial agents with the natural resins can be realized both in parallel and in series. Thus, it is, for instance, possible to run the sugar production process temporarily in the presence of added resins and temporarily in the presence of hop products, for instance β-hop acids, both successively and concomitantly.

The addition according to the invention of food-compatible resins, in particular colophony or colophony derivatives, is feasible at any point of time during sugar production: it is, for instance, feasible to spray resinous solutions onto vegetable materials (e.g., sugar beets or sugar cane) already during the storage of the same. Preferably, the natural resins are present at least during the thermal extraction of sugar-containing plant parts, particularly sugar beets or sugar cane. It is, for instance, feasible to add tree resins to the plant parts to be extracted after the mechanical disintegration of the sugar-containing vegetable raw materials.

A conventional sugar production process is, for instance, represented in Ullmann's Encyklopädie der Technischen Chemie, 4$^{th}$ Ed., Vol. 24, pp 703 to 748, wherein the addition according to the invention of natural resins can be realized at any of the (partial) steps described there.

According to the invention, the natural resins are preferably added to the extraction solution by which the sugar is extracted from the sugar-containing plants in raw materials.

According to a preferred embodiment of the method according to the invention, the natural resins are used in the purification of the raw juice, preferably in stages at low pH values.

According to a particularly preferred embodiment in which the resins according to the invention proved especially successful, membrane treatment procedures or ion exchange procedures are carried out in the course of the sugar production process in the presence of said natural resins.

Preferably, the natural resins are used at sugar concentrations of from 0.1 to 80% and, in particular, at elevated temperatures such as temperatures ranging from 50 to 80° C. The addition according to the invention of resins during the production and storage of the thick juice turned out to be particularly beneficial such that the natural resins are used, in particular, at sugar concentrations of from 60 to 70% and, in particular, at temperatures of from 10 to 30° C.

Finally, the presence of resins during the recovery of sugar from thick juice proved to be particularly suitable.

The risk of bitter flavors being introduced into the sugar products, which actually happened with hop products, is to be excluded in the event of tree resins like pine resin products, because pine resins have no bitter taste. Thus, colophony, for instance, is neutral in taste.

In a particularly advantageous manner, the treatment with an agent based on pine resin is effected alternatingly with a treatment with a microorganism-inhibiting agent based on hop in order to combat the adaptation of microorganisms to the hop preparation and a selection of hop-resistant microorganisms.

If no selection or adaptation whatsoever is observed in a process, a combined agent made, e.g., from pine resins and hop products can be applied in order to obtain a particularly high activity of a single combined agent.

If a sugar-containing substrate such as, e.g., a sugar-containing liquid culture medium as commonly used in microbiology is incubated either unsterilized or upon inoculation of a bacterial strain, this will result in acid formation, which will best be recognized by a drop of the pH value. The same phenomenon occurs upon the inoculation of normal sugar-containing plant juices such as, e.g., beet juices. A pH drop by sugar degradation in an industrial process like, for instance, that of obtaining sugar juice from sugar beets, implies a loss of sugar and the need for alkalizing agents. Moreover, a pH drop goes hand in hand with an increase in the germ content of the substrate and frequently also an unpleasant gas and nitrite formation.

If, for instance, a solution of rosin acids is added during the acid formation caused by thermophilic microorganisms at elevated temperatures, the acid formation, and hence the entrained pH drop, will be stopped from a concentration of about 10–30 mg/liter. The disadvantages involved in acid formation can, thus, be avoided by the addition of, e.g., pine resins or colophony to a sugar-containing substrate. It is, therefore, preferably operated at elevated temperatures, because the main components of the pine resins, i.e. rosin acids, are less readily soluble in cold aqueous systems than in warm systems. They can, therefore, be used particularly well against thermophilic microorganisms at elevated temperatures, if only because of this better solubility. Besides, the flora of microorganisms is limited to few bacterial species at high temperatures. At low temperatures, the amount of added resin can be accordingly increased in order to achieve comparable effects.

In slightly alkaline sugar juices, the increased dissociation of colophonic acids provides an enhanced solubility, and it is, therefore, not necessary to increase the solubility by raising the temperature, if slightly alkaline ranges are applied. If slightly alkaline conditions prevail, it is, therefore, possible to combat osmotolerant microorganisms even at normal temperatures by the aid of colophonic resins, which are difficult to dissolve in aqueous systems, although in this case higher concentrations of active substances will be required than when using the same against thermophilic microorganisms.

Surprisingly, natural resins, e.g. rosin acids, exhibit a markedly lower activity against yeasts than against thermophilic bacteria. Moreover, they are poorly soluble under the pH and temperature conditions of yeast cultures such that the properties known from hop products, which above all have bacteria-inhibiting effects, occur also with pine resins. Residual quantities of rosin acids in molasses, which are destined to be exploited by yeasts, can therefore be regarded as safe, compared to some chemical agents like quaternary ammonium bases.

With the objects of the invention in view, there is also provided an extraction liquid for the extraction of sugar-containing vegetable raw materials, which, in addition to the usual components of such an extraction liquid, includes natural resins, in particular colophony or colophony derivatives. Such extraction liquids, in addition to the extracted sugar (sucrose), contain traces of glucose and fructose as well as components that are characteristic of the respective vegetable raw material, such as, for instance, betaine (in the case of sugar beets) or aconitic acid (in the case of sugar cane). Further ingredients include amino acids like alanine, aspartamic and glutamic acid, isoleucine, leucine, threonine or valine (ranging from 10–200 mg/l crude juice), oxalate, citrate, lactate or maleate (10–5000 mg/l crude juice) and/or shikimic acid or flavonoids or phenolic components like coffeinic acid, 3,4-dihydroxy benzoic acid, chlorogenic acid, apigenine, swertisine, luteoline or tricine. (Schneider, "Technologie des Zuckers". Verlag Schaper, Hannover (1968), 247–253; van der Poel et al., "Sugar Technology", Verlag Dr. Bartens, Berlin (1998), 152–157; van der Poel et al., "Zuckertechnologie", Verlag Dr. Bartens, Berlin (2000), 163–168).

According to a preferred embodiment, the extraction liquid according to the invention additionally contains hop or hop derivatives.

According to a further aspect, the present invention also relates to sugars or sugar-containing products from vegetable raw materials, that are obtainable by the method according to the invention and accordingly have a (residual) content of added natural food-compatible resins, in particular colophony or colophony derivatives. This content can be readily detected by analytical methods known per se, such as gas chromatography, HPLC, etc. Sugars or sugar-containing products preferred according to the invention have resin contents starting at the detection limit up to concentrations of 1 by weight or—if the resin taste is to be particularly emphasized—more (i.e., also in the one- to even two-digit percentage ranges). Yet, according to the invention, preferred products also encompass all sugars and sugar by-products occurring in industrial sugar production such as, for instance, beet-chip fodder, carbolime, thick juice and molasses. Beet-chip fodder, which is offered, for instance, in the form of pressed products, constitutes a particularly beneficial growth medium for undesired microorganisms. It goes without saying that such an infestation can decisively affect the quality of such products as fodders. The presence of added natural resins reduces not only such product impairments by faulty fermentations, but also the formation of undesired malodors. For instance, the calcium precipitated in a sugar process ("carbolime"), which is used as a fertilizer, is often infested with clostridia. Their growth frequently entails undesired malodors so that the transportation of this fertilizer is usually feasible only in closed containers. In addition, the addition of natural resins according to the invention might be beneficial to enhancing the stability and transportability of carbolime by decisively reducing, or preventing, odor formation. Molasses, too constitute important starting products for fodders, fermentation raw materials, chromatographic separation (recovery of sucrose and betaine) and as briquetting aids, and—like thick juice—is consequently a transportable product which can or must also be stored. The addition according to the invention of food-compatible resins to such products, in particular in the course of industrial sugar production processes, will result in a decisively prolonged stability as well as an enhanced storing capacity of such products and will prevent product changes due to the activity of undesired microorganisms.

Usual (residual) concentrations of added resins in selected end products preferably range from 1 ng to 10 mg, particularly 100 ng to 500 $\mu$g in the case of sugar, and from 10 $\mu$g to 1 g, particularly 1 to 100 mg in the case of molasses.

According to a further aspect, the present invention also relates to the use of natural resins, in particular colophony or colophony derivatives, in sugar production. In this context, their use to inhibit thermophilic and osmotolerant microorganisms and, in particular, bacillus, thermos, and clostridia is particularly preferred.

Other features that are considered as characteristic for the invention are set forth in the appended claims.

Although the invention is illustrated and described herein as embodied in a method for the production of sugar or sugar-containing products from sugar-containing vegetable raw materials, sugar and sugar-containing products made by the method, and an extraction solution for use in the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DESCRIPTION OF THE PREFERRED EMBODIMENTS

EXAMPLE 1

A liquid nutrient medium as used in microbiology and including 10 g bactopepton, 5 g meat extract, 5 g yeast extract, 1 g glucose, 1 g $K_2HPO_4$, 0.3 g $KNO_3$, 0.1 g $MgSO_4 \cdot 7H_2O$ and 0.01 g $FeSO_4 \cdot 7H_2O$ per liter distilled water, is sterilized in the usual manner for 20 minutes at 120° C. and inoculated with 20 ml crude juice from large-scale sugar beet extraction in a 500 ml vessel heated at 65° C., with the pH being recorded on a recorder. After the proliferation of thermophilic bacteria, the pH drops progressively. This demonstrates the activity of microorganisms by acid formation.

In the present example, no influence on the pH drop is yet observed after the addition of up to 300 $\mu$l of a 5% alcoholic pine resin solution per liter culture liquid. After the addition of further 100 $\mu$l, acid formation is stopped at once and the pH remains constant for 2 hours. This reveals an at least two-hour activity at a concentration of 20 mg pine resin per liter culture liquid in the instant case.

| | Time (h) | | | | | | | | | | | | | |
|---|---|---|---|---|---|---|---|---|---|---|---|---|---|---|
| | 0 | 0.5 | 1 | 1.5 | 2 | 2.5 | 3 | 3.5 | 4 | 4.5 | 5 | 5.5 | 6 | 6.5 |
| pH | 6.88 | 6.86 | 6.84 | 6.54 | 6.83 | 6.82 | 6.82 | 6.80 | 6.60 | 6.37 | 6.27 | 6.27 | 6.27 | 6.28 |
| $\Delta$pH/h | | 0.04 | 0.04 | 0.00 | 0.02 | 0.02 | 0.00 | 0.04 | 0.40 | 0.46 | 0.20 | 0.00 | 0.00 | −0.02 |

Addition of solution: 200 $\mu$l at pH 6.31 plus 100 $\mu$l at pH 6.29 plus 100 $\mu$l at pH 6.27

EXAMPLE 2

Crude juice from a beet sugar factory is diluted to 2% dry substance in order to simulate concentration ratios in the upper parts of beet extraction plants. The diluted juice is stirred at 65° C. A pH drop is caused by the propagation of microorganisms and can be stopped by the addition of a 5% alcoholic pine resin solution. 600 $\mu$l of the solution are necessary per liter juice in order to stop the acid formation in the present example. This corresponds to 30 mg pine resin per liter culture liquid.

| | Time (h) | | | | | |
|---|---|---|---|---|---|---|
| | 0 | 0.5 | 1 | 1.5 | 2 | 2.5 | 3 |
| pH | 6.55 | 6.57 | 6.57 | 6.57 | 6.42 | 6.01 | 6.01 |
| $\Delta$pH/h | | 0.04 | 0.00 | 0.00 | 0.30 | 0.82 | 0.00 |

Addition of solution: 200 $\mu$l at pH 6.09 plus 4 × 100 $\mu$l between pH 6.07 and pH 6.01

EXAMPLE 3

A liquid nutrient medium as used in Example 1, yet diluted with sterile distilled water at a ratio of 1:1, is inoculated with a highly thermophilic strain of *Bacillus stearothermophilus* (DSM No. 457) at 65° C., and the proliferation of the strain is followed by pH recording. By the addition of 500 $\mu$l of a 5% alcoholic pine resin solution per liter culture liquid, the pH drop can be stopped in this example; this corresponds to 25 mg pine resin per liter.

| | Time (h) | | | | | | |
|---|---|---|---|---|---|---|---|
| | 0 | 0.5 | 1 | 1.5 | 2 | 2.5 | 3 | 3.5 |
| pH | 6.85 | 6.82 | 6.79 | 6.94 | 6.57 | 6.23 | 6.27 | 6.28 |
| $\Delta$pH/h | | 0.06 | 0.06 | 0.10 | 0.34 | 0.68 | −0.08 | −0.02 |

Addition of solution: 200 $\mu$l at pH 6.29 plus 3 × 100 $\mu$l between pH 6.27 and pH 6.23

EXAMPLE 4

A liquid nutrient medium as used in Example 1 is inoculated with 20 ml crude juice from a sugar factory, stirred at 65° C. and the pH drop is followed. The alcoholic solution is replaced with a 5% aqueous pine resin solution in which the rosin acids are in equilibrium with sodium ions. By the addition of 300 µl solution per liter culture liquid, which corresponds to 15 mg pine resin per liter, the pH drop can be stopped.

| | Time (h) | | | | | | | | | | | | |
|---|---|---|---|---|---|---|---|---|---|---|---|---|---|
| | 0 | 0.5 | 1 | 1.5 | 2 | 2.5 | 3 | 3.5 | 4 | 4.5 | 5 | 5.5 | 6 |
| pH | 7.06 | 6.99 | 6.97 | 6.97 | 6.96 | 6.96 | 6.96 | 6.94 | 6.89 | 6.72 | 6.41 | 6.42 | 6.42 |
| ΔpH/h | | 0.14 | 0.04 | 0.00 | 0.02 | 0.00 | 0.00 | 0.04 | 0.10 | 0.34 | 0.62 | −0.02 | 0.00 |

Addition of solution: 200 µl at pH 6.43 plus 1 × 100 µl at pH 6.41

EXAMPLE 5

A liquid nutrient medium as used in Example 1 is inoculated with a highly thermophilic strain of *Bacillus stearotherophilus* (DSM No. 457) at 65° C., and the proliferation of the strain is followed by pH recording. The alcoholic pine resin solution is replaced with a 1% alcoholic solution of commercially available colophony. By adding 2 ml per liter culture medium, which corresponds to 20 mg colophony per liter, the pH drop can be stopped for several hours.

| | Time (h) | | | | | | | | | | | | | |
|---|---|---|---|---|---|---|---|---|---|---|---|---|---|---|
| | 0 | 0.5 | 1 | 1.5 | 2 | 2.5 | 3 | 3.5 | 4 | 4.5 | 5 | 5.5 | 6 | 6.5 |
| pH | 6.90 | 6.90 | 6.88 | 6.86 | 6.81 | 6.63 | 6.33 | 6.43 | 6.44 | 6.44 | 6.44 | 6.44 | 6.44 | 6.44 |
| ΔpH/h | | 0 | 0.04 | 0.04 | 0.10 | 0.36 | 0.60 | −0.20 | −0.02 | 0 | 0 | 0 | 0 | 0 |

Addition of solution: 200 ml at pH 6.33

EXAMPLE 6

A liquid nutrient medium is used as in Example 5. The alcoholic colophony solution is replaced with a 1% alkaline aqueous colophony solution in which the rosin acids are in equilibrium with sodium ions. By the addition of 1.4 ml per liter culture medium, which corresponds to 14 mg colophony per liter, the pH drop can be stopped.

| | Time (h) | | | | | | | | |
|---|---|---|---|---|---|---|---|---|---|
| | 0 | 0.5 | 1 | 1.5 | 2 | 2.5 | 3 | 3.5 | 4 |
| pH | 6.96 | 6.93 | 6.91 | 6.88 | 6.84 | 6.70 | 6.39 | 6.44 | 6.44 |
| ΔpH/h | | 0.06 | 0.04 | 0.06 | 0.08 | 0.28 | 0.62 | −0.10 | 0 |

Addition of solution: 1.4 ml at pH 6.37

EXAMPLE 7

The pH drop of a thermophilic bacteria culture according to Example 1 can be stopped by the aid of a 20% solution A of rosin acids—sodium salt at a slight alkali excess (pH 10) upon attainment of a concentration of 50 mg/l. A commercially available solution B with 10% β-hop acids is able to stop the pH drop at 20 mg/l. A mixture of 3 volumes of solution A and 1 volume of solution B is able to stop such a culture upon attainment of 30 mg/l. According to the mixture equation, an effect is to be expected only at (1*20+ 3*50)/4=42.5 mg/l. An effect at 30 mg/l demonstrates an action advantage at the combined application of both active substances.

EXAMPLE 8

The pH of a syrup having 60% dry substances was lowered to 8.4 from the original value of 9 by osmotolerant microorganisms. A further pH drop is to be avoided or at least delayed by the addition of an agent. The juice is supplemented with rosin acids at a concentration of 200 ppm in the form of a 20% sodium salt solution. After 5 days of storage at 22° C., the pH of the thus treated juice is still 8.39, while the pH of the untreated juice (reference sample) has already dropped to pH 6.55. This demonstrates the delayed action of pine resin on osmotolerant microorganisms. For comparison, a numerical value is also indicated for 350 ppm formaldehyde (100%).

| | Observation time (days) | | | | | | | |
|---|---|---|---|---|---|---|---|---|
| | 0 | 1 | 2 | 5 | 0 | 1 | 2 | 5 |
| | | ph value | | | | ph drop | | |
| No addition | 8.44 | 8.23 | 7.88 | 6.55 | 0 | 0.21 | 0.56 | 1.86 |
| 350 ppm HCHO | 8.44 | 8.05 | 7.96 | 7.77 | 0 | 0.39 | 0.48 | 0.67 |
| 200 ppm pine resin | 8.44 | 8.44 | 8.43 | 8.39 | 0 | 0.00 | 0.01 | 0.05 |

EXAMPLE 9

A liquid nutrient medium as used in Example 1 is inoculated with 40 ml crude juice from a sugar factory per liter, stirred at 65° C. and the pH drop is followed. A solution of 15 mg pure neoabietic acid (99%) per 1.5 ml ethanol is prepared. By four additions of 0.2 ml solution each, per liter culture liquid, which corresponds to a total of 8 mg neoabietic acid per liter, the pH drop can be stopped.

| | Time (h) | | | | | | | | | | | | | |
|---|---|---|---|---|---|---|---|---|---|---|---|---|---|---|
| | 0 | 1 | 2 | 3 | 3.5 | 4 | 4.5 | 5 | 5.5 | 5.8 | 6 | 6.5 | 7 | 8 |
| pH | 6.90 | 6.90 | 6.89 | 6.87 | 6.86 | 6.85 | 6.82 | 6.72 | 6.54 | 6.30 | 6.24 | 6.24 | 6.25 | 6.25 |
| ΔpH/h | | 0.00 | 0.01 | 0.02 | 0.02 | 0.02 | 0.06 | 0.20 | 0.36 | 0.80 | 0.30 | 0.00 | −0.02 | 0.00 |

Addition of solution: 0.2 ml each, at pH values of 6.30 and 6.28 and 6.26 and 6.24

EXAMPLE 10
Large-scale Example

A beet extraction plant for the continuous processing of 12,000 tons of beets per day, including an extraction column and three counterflow-slicing mashers, is operated without any addition of known agents for the reduction of bacterial activity, such as formalin and dithiocarbamates. Lactic acid fermentation occurs in the plant, which causes a lactic acid content of 600 mg/l in the crude juice recovered from the plant. By dosing a 10% solution of rosin acids in sodium salt form in 6 batches per day, with 200 liters of solution being each dosed within 2 minutes, the lactic acid content of the crude juice can be lowered to 300 mg/l such that the sugar loss occurring in the plant on account of lactic acid formation is markedly reduced.

We claim:

1. A method for producing sugar or sugar-containing products from sugar-containing plant raw materials, which comprises adding a natural food-compatible resin to the sugar-containing plant raw materials.

2. The method according to claim 1, wherein the natural food-compatible resin includes a tree resin.

3. The method according to claim 2, which further comprises selecting the tree resin from the group consisting of colophony and a colophony derivative.

4. The method according to claim 1, which further comprises using a concentration from 0.1 to 1000 mg/l of the natural food-compatible resin.

5. The method according to claim 4, wherein the concentration is from 5 to 40 mg/l.

6. The method according to claim 5, wherein the concentration is from 10 to 25 mg/l.

7. The method according to claim 1, which further comprises:
forming a salt-containing solution including the natural food-compatible resin; and
adding the natural food-compatible resin by adding the salt-containing solution.

8. The method according to claim 7, wherein the salt-containing solution is a potassium salt solution.

9. The method according to claim 8, wherein the potassium salt solution has a potassium salt concentration of 35%.

10. The method according to claim 7, wherein the salt-containing solution is a sodium salt solution.

11. The method according to claim 7, wherein the sodium salt solution has a salt concentration from 0.5 to 35%.

12. The method according to claim 1, which further comprises:
forming a salt-containing suspension including the natural food-compatible resin; and
adding the natural food-compatible resin by adding the salt-containing suspension.

13. The method according to claim 1, which further comprises:
forming a salt-containing solution having a salt concentration from 5 to 20% and including the natural food-compatible resin; and
adding the natural food-compatible resin by adding the salt-containing solution.

14. The method according to claim 1, which further comprises:
forming a salt-containing suspension having a salt concentration from 5 to 20% and including the natural food-compatible resin; and
adding the natural food-compatible resin by adding the salt-containing suspension having a salt concentration.

15. The method according to claim 1, which further comprises:
forming an alcoholic solution including the natural food-compatible resin; and
adding the natural food-compatible resin by adding the alcoholic solution.

16. The method according to claim 15, wherein the alcoholic solution has a concentration of ethanol from 1 to 95%.

17. The method according to claim 15, wherein the alcoholic solution has a concentration of ethanol from 10 to 80%.

18. The method according to claim 1, which further comprises:
forming an alcoholic suspension including the natural food-compatible resin; and
adding the natural food-compatible resin by adding the alcoholic suspension.

19. The method according to claim 1, which further comprises combining the natural food-compatible resin with an anti-microbial agent.

20. The method according to claim 1, which further comprises combining the natural food-compatible resin with a food-compatible anti-microbial agent.

21. The method according to claim 20, wherein the food-compatible anti-microbial agent is selected from the group consisting of hops and a hop derivative.

22. The method according to claim 1, which further comprises adding the natural food-compatible resin in a dry form.

23. The method according to claim 1, which further comprises adding the natural food-compatible resin in a pasty form.

24. The method according to claim 1, which further comprises thermally extracting sugar-containing plant parts while including the natural food-compatible resin.

25. The method according to claim 24, which further comprises selecting the sugar-containing plant parts from the group of sugar-containing plants consisting of a sugar beet and sugar cane.

26. The method according to claim 1, which further comprises:
mechanically disintegrating sugar-containing plant raw materials to be extracted; and
subsequently adding the natural food-compatible resin to the sugar-containing plant raw materials.

27. The method according to claim 1, which further comprises:
    extracting a solution from sugar-containing plant raw materials; and
    adding the natural food-compatible resin to the solution.

28. The method according to claim 1, which further comprises purifying raw juice by using the natural food-compatible resin.

29. The method according to claim 1, which further comprises membrane treating the sugar-containing plant raw materials along with the natural food-compatible resin.

30. The method according to claim 1, which further comprises ion-exchanging the treatment sugar-containing plant raw materials along with the natural food-compatible resin.

31. The method according to claim 1, which further comprises:
    forming a solution having a sugar concentration by dissolving the sugar-containing plant raw materials and the natural food-compatible resin; and
    regulating the sugar concentration within a range from 0.1 to 80%.

32. The method according to claim 31, which further comprises maintaining a temperature ranging from 50 to 80° C.

33. The method according to claim 1, which further comprises:
    forming a solution having a sugar concentration by dissolving the sugar-containing plant raw materials and the natural food-compatible resin; and
    regulating the sugar concentration within a range from 60 to 70%.

34. The method according to claim 33, which further comprises maintaining a temperature ranging from 10 to 30° C.

35. The method according to claim 1, which further comprises providing the sugar-containing plant raw materials as a thick juice.

36. A sugar or sugar-containing product based on plant raw materials, which is obtainable by a method according to claim 1 and comprises a natural food-compatible resin.

37. The sugar or sugar-containing product according to claim 36, wherein the natural food-compatible resin is selected from the group consisting of colophony and a colophony derivative.

38. The sugar or sugar-containing product according to claim 36, wherein the sugar-containing vegetable raw material is selected from the group consisting of beet-chip fodder, carbolime, thick juice, and molasses.

39. An extraction liquid for extracting sugar from sugar-containing plant raw materials, comprising a natural food-compatible resin.

40. The extraction liquid according to claim 39, wherein said natural food-compatible resin is selected from the group consisting of colophony and a colophony derivative.

41. The extraction liquid according to claim 39, further comprising hops.

42. The extraction liquid according to claim 39, further comprising a hop derivative.

43. A method of using natural resins, which comprises producing sugar by adding a natural food-compatible resin to a sugar-containing plant raw material.

44. The method according to claim 43, wherein the natural resin is selected from the group consisting of colophony and a colophony derivative.

45. The method according to claim 43, which further comprises inhibiting thermophilic and osmotolerant microorganisms with the natural resins.

46. The method according to claim 45, wherein the microorganisms are selected from the group consisting of bacillus, thermos, and chlostridia species.

* * * * *